United States Patent [19]

Fiedler

[11] Patent Number: 5,016,446
[45] Date of Patent: May 21, 1991

[54] RECIRCULATION SYSTEM FOR SOFT SERVE ICE CREAM APPARATUS

[75] Inventor: Armin Fiedler, Chicago, Ill.

[73] Assignee: International Freezer Corporation, Chicago, Ill.

[21] Appl. No.: 467,026

[22] Filed: Jan. 18, 1990

[51] Int. Cl.⁵ .................................................. A23G 9/12
[52] U.S. Cl. .................................. 62/342; 222/146.6; 222/318; 366/306
[58] Field of Search ................... 62/342, 343; 222/318, 222/146.6; 137/563; 366/302, 306

[56] References Cited

U.S. PATENT DOCUMENTS

| | | | |
|---|---|---|---|
| 1,341,447 | 5/1920 | Timm | 137/563 |
| 1,750,148 | 3/1930 | Zabriskie | 222/318 X |
| 2,692,798 | 10/1954 | Hicks | 137/563 X |
| 2,784,565 | 3/1957 | Stalkup | 62/342 |
| 3,050,960 | 8/1962 | Clifford | 62/342 |
| 3,353,712 | 11/1967 | Prescott | 222/318 X |
| 3,951,387 | 4/1976 | Warden et al. | 366/302 X |
| 4,192,361 | 3/1980 | Moser | 222/318 X |
| 4,336,748 | 6/1982 | Martin et al. | 137/563 X |

Primary Examiner—William E. Tapolcai
Attorney, Agent, or Firm—Mason, Kolehmainen, Rathburn & Wyss

[57] ABSTRACT

A soft serve ice cream dispensing apparatus includes a tank, a closure plate having an integrally formed dispensing chamber and a recirculation passageway and a dispensing valve. When the dispensing valve is closed, the recirculation passageway is not in communication with the dispensing chamber. This allows the apparatus to recirculate ice cream without causing it to flow through the dispensing chamber. During recirculation, the ice cream is recirculated in an open loop consisting of the recirculation passageway, a hollow tube and the tank. The hollow tube is in flow communication with the recirculation chamber, formed in the closure plate, and the interior of the tank and extends approximately one-third of the distance into the tank. An important aspect of the invention relates to the simplicity and reduced number of parts of the recirculation system which significantly facilitates cleaning. Another important aspect of the invention relates to the fact that the recirculation loop does not include the dispensing valve chamber which greatly reduces liquefaction of the ice cream.

25 Claims, 2 Drawing Sheets

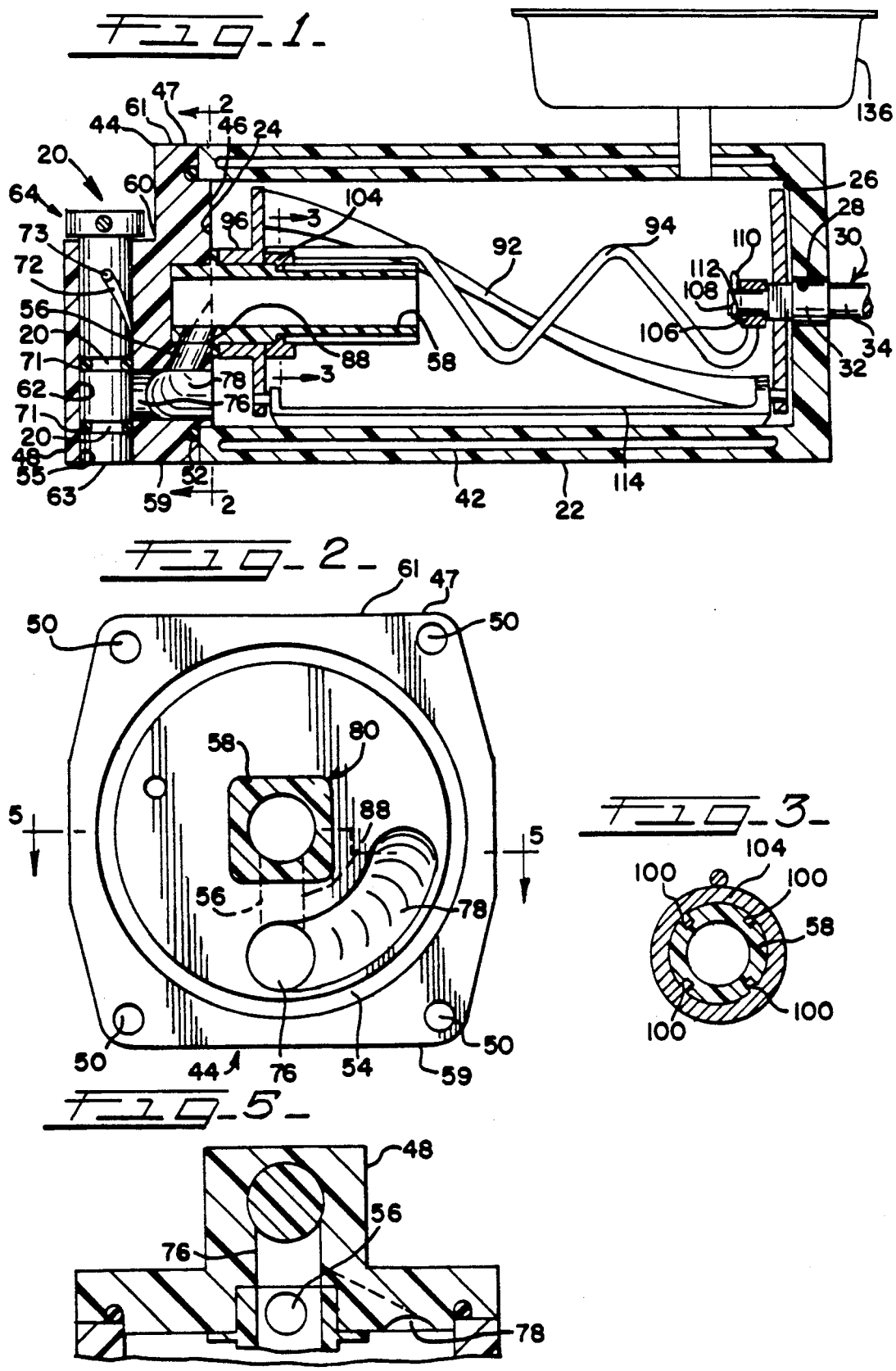

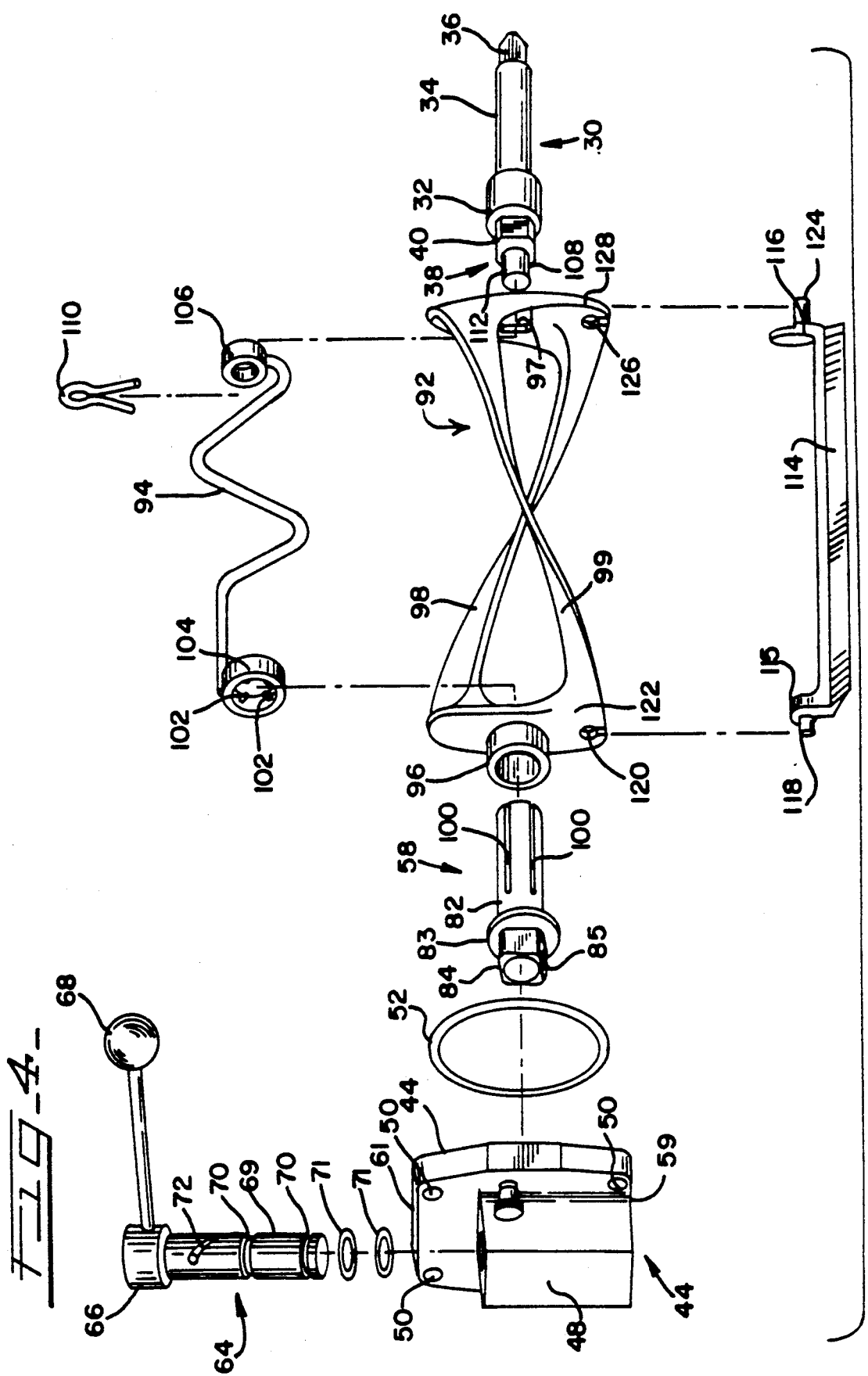

RECIRCULATION SYSTEM FOR SOFT SERVE ICE CREAM APPARATUS

BACKGROUND OF THE INVENTION

1. Field of the Invention

This invention generally relates to a soft serve ice cream dispensing apparatus and more particularly to a system for recirculating ice cream to prevent liquefaction adjacent the dispensing valve.

2. Description of the Prior Art

Soft serve ice cream dispensing apparatus are generally known in the art. Examples of such apparatus are disclosed in U.S. Pat. Nos. 2,784,565 and 3,050,960. Such apparatus generally consist of a horizontal cylindrical tank surrounded by a refrigerant chamber. The tank is open on one end and closed by a closure plate containing a dispensing valve. The closure plate, generally made from a nylon or other suitable polymeric material, is subject to ambient temperature. Even though nylon is a fairly good heat insulator, some heat nonetheless is absorbed from the ambient air causing the ice cream to liquefy in the area adjacent the dispensing valve.

Liquefaction of the ice cream is a highly undesirable condition. In such a case, the liquid must be drawn off and discarded before the ice cream is served causing a considerable amount of waste. Furthermore, depending upon the amount of time since the last customer was served, the liquid ice cream can become subject to bacterial buildup and thus require that the entire machine be cleaned and sanitized.

Various means are known in the art for reducing liquefaction of the ice cream in the area adjacent the dispensing valve. For example, in U.S. Pat. No. 2,784,565 to Stalkup, a recirculation loop is provided external to the tank. The recirculation loop is attached between the dispensing valve chamber and the tank. When the dispensing valve is closed soft serve ice cream is continuously recirculated through the dispensing valve chamber and back into the tank.

U.S. Pat. No. 3,050,960 to Clifford discloses a soft serve ice cream machine with an internal recirculation loop. More specifically, a hollow shaft is provided interior to the tank. One end of the shaft is in open communication with the dispensing valve chamber while the opposite end contains an exit orifice to allow the ice cream to be recirculated back into the tank. Another passageway is provided in communication with the inside of the tank and the dispensing valve chamber to allow the ice cream to flow from the tank into the dispensing valve chamber and into the hollow shaft.

In both of the aforementioned machines, the dispensing valve chamber forms a portion of the recirculation loop. Since the dispensing valve chamber is the area where the greatest amount of heat is absorbed from the ambient air, the ice cream that is recirculated through the dispensing valve chamber can cause additional loading of the refrigeration system.

Another problem with the recirculation systems disclosed in the prior art is that such systems are relatively difficult to clean. More specifically in both the Clifford and Stalkup patents the recirculation loop includes a hollow recirculation pipe that extends substantially the length of the horizontal tank that is cumbersome to clean. In addition, the Clifford patent discloses a second flow passageway between the tank and the valve dispensing chamber which must also be cleaned.

SUMMARY OF THE INVENTION

It is an object of the present invention to provide a soft serve ice cream machine which solves the problems associated with the prior art.

It is another object of the present invention to provide a soft serve ice cream machine with a recirculation loop which prevents liquefaction of the ice cream adjacent the dispensing valve.

It is yet a further object of the present invention to provide a soft serve ice cream dispensing machine that is relatively easy to clean.

It is yet a further object of the present invention to provide a soft serve ice cream dispensing machine with a recirculation loop which does not require recirculation through the dispensing valve chamber.

Briefly, the present invention relates to a soft serve ice cream dispensing machine which closes off the dispensing valve chamber during recirculation to reduce liquefaction of the ice cream. The machine includes a tank, a closure plate having an integrally formed dispensing chamber and a recirculation chamber and a dispensing valve. When the dispensing valve is closed, the recirculation chamber is not in communication with the dispensing chamber. This allows the apparatus to recirculate ice cream without causing it to flow through the dispensing chamber. During recirculation, the ice cream is recirculated in an open loop consisting of the recirculation passageway, a hollow recirculation tube and the tank. The hollow tube is in flow communication with the recirculation passageway, formed in the closure plate, and the interior of the tank. The recirculation tube is relatively short and extends approximately one-third of the distance into the tank. Another important aspect of the invention relates to the simplicity and reduced number of parts of the recirculation system which significantly facilitates cleaning.

DESCRIPTION OF THE DRAWING

These and other objects and advantages of the present invention will become readily apparent upon consideration of the following detailed description of the attached drawing, wherein:

FIG. 1 is an elevational view in section of the soft serve ice cream apparatus in accordance with the present invention;

FIG. 2 is a sectional view taken along line 2—2 of FIG. 1;

FIG. 3 is a sectional view taken along line 3—3 of FIG. 1;

FIG. 4 is an exploded perspective view of several of the components forming the soft serve ice cream apparatus illustrated in FIG. 1; and FIG. 5 is a plan sectional view taken along line 5—5 of FIG. 2.

DETAILED DESCRIPTION

The soft serve ice cream apparatus in accordance with the present invention is generally identified with the reference numeral 20. The soft serve ice cream apparatus 20 includes a generally horizontal tank 22 open on one end 24. The other end 26 of the horizontal tank 22 is provided with an aperture 28 for receiving a drive shaft 30. The drive shaft 30 includes an increased diameter portion 32, journalled in the aperture 28. An outwardly extending portion 34 of the shaft 30 having a square end 36 is attached to a drive motor (not shown). An interior portion 38 of the shaft 30 is formed with a square portion 40, adjacent the increased diameter portion 32, for driving the internal components of the machine as will be discussed below.

The tank 22 further includes a refrigerant chamber 42 in which a refrigerant is circulated by a refrigeration system (not shown). Refrigeration systems are generally well known in the art and does not form a part of the present invention.

An important aspect of the invention relates to a closure plate 44 used to close the open end 24 of the tank 22. The closure plate 44 is formed as a generally rectangular member having a flange portion 47, an inwardly extending closing portion 46 and an outwardly extending dispensing valve chamber portion 48. The flange portion 47 is provided with a plurality of apertures 50 to allow the closure member 44 to be attached to the tank 22 with suitable fasteners (not shown).

The closing portion 46 is formed with a circular cross-section having a slightly smaller diameter than the interior diameter of the tank 22. As best shown in FIG. 1, the closing portion 46 extends partially within the tank 22. An O-ring 52 is received in an annular groove 54 formed adjacent the flange portion 47. The O-ring 52 serves to seal the closure plate 44 with respect to the tank 22.

In addition to closing the end 24 of the tank 22, the closure plate 44 also includes a dispensing chamber 55, a recirculation passageway 56 and means for carrying a recirculation tube 58. More specifically, the dispensing chamber 55 is formed in the outwardly extending portion 48 as a generally rectangular member which extends from the bottom end 59 of the closure plate 44 to a point 60 below the top surface 61 of the closure plate 44 forming a stepped surface. A longitudinal bore 62 is provided in the outwardly extending portion 48. The bore 62 extends from the point 60 to an exit orifice 63 at the bottom end 59 of the closure plate 44. A plunger type dispensing valve 64 is received in the bore 62 for dispensing of the ice cream from the exit orifice 63.

The dispensing valve 64 is formed as a generally cylindrical member having an enlarged portion 66 on one end to which a handle 68 is attached and a stem portion 69. Annular grooves 70 are provided in the stem portion 69 for receiving O-rings 71. The O-rings 71 serve to seal dispensing valve 64 within the bore 62. The stem portion 69 also includes a helical groove 72 which cooperates with a pin 73 protruding radially inwardly relative to the bore 62.

When the dispensing valve 64 is in the serve position, soft serve ice cream flows from the tank 22 through the dispensing chamber 55 and out the exit orifice 63. As the dispensing valve 64 is rotated in a clockwise direction (as viewed from the bottom of FIG. 1) this causes the stem portion 69 to move downwardly to a recirculation position wherein the dispensing chamber 55 is closed off. When the dispensing valve 64 is fully seated as shown in FIG. 1, the bottom side of the enlarged portion 66 of the dispensing valve 64 is disposed adjacent the stepped surface 60. As the dispensing valve 64 is rotated in a counterclockwise direction (FIG. 1), the pin 73 rides in the helical groove 72 causing the dispensing valve 64 to be displaced upwardly to allow soft serve ice cream to be dispensed from the exit orifice 63.

An important aspect of the invention relates to the fact that when the dispensing valve 64 is closed, only a negligible amount of soft serve ice cream will be contained in the dispensing chamber 55. This is due to the plunging action of the dispensing valve 64 as it is moved downwardly in the dispensing chamber 55 as well as the fact that in this condition, the dispensing chamber 55 is not in flow communication with the recirculation passageway 56. More specifically, the stem portion 69 of the dispensing valve 64 is formed with a diameter slightly smaller than the interior diameter of the bore 62. As the dispensing valve 64 is moved downwardly, virtually all of the ice cream in the dispensing chamber 55 where it is most susceptible to ambient heat absorption, is forced out of the exit orifice 63.

The recirculation passageway 56 allows the ice cream to recirculate within the tank 22. As best shown in FIGS. 1 and 5, the recirculation passageway 56 forms part of a recirculation loop which also includes the recirculation tube 58 and the tank 22. An important aspect of the invention relates to the fact that the recirculation passageway 56 is not in communication with the dispensing chamber 55 when the dispensing valve 64 is closed (i.e., in the recirculation position). More specifically, the recirculation passageway 56 includes an axial bore 76, a radial notch 78 and a radial bore 88 provided in the closure plate 44. The axial bore 76 extends from an edge of the closing portion 46 of the closure plate 44 to the bore 62 including the dispensing chamber 55. Thus, when the dispensing valve is open (i.e., the bottom surface of the dispensing valve 64 is above the top surface of the axial bore 76), ice cream can flow through the axial bore 76 into the dispensing chamber 55 and out of the exit orifice 63. However, when the dispensing valve 64 is closed, the dispensing chamber 55 is sealed off from the recirculation passageway 56.

In order to facilitate the flow of ice cream into the axial bore 76, the radial notch 78 is provided in the closure plate 44. The radial notch 78 is in flow communication with the axial bore 76 and is ramped as best shown in FIG. 5.

A square bore 80 is provided in the center of the closing portion 46 in the closure plate 44 for receiving one end of the recirculation tube 58. More specifically, the recirculation tube 58 is formed with a tubular portion 82 having a square end 84 that is received in the square bore 80. This arrangement prevents rotation of the recirculation tube 58 with respect to the closure plate 44. The recirculation tube 58 also includes an integrally formed washer 83 at the interface between the tubular portion 82 and the square end 84.

A recirculation orifice 85 is provided in one face of the square end 84 of the recirculation tube 58 and thus is in a plane generally parallel to the axis of the recirculation tube 58. A radial bore 88 is provided in the closing portion 46 of the closure plate 44 between the axial bore 76 and the square bore 80 to provide a communication path therebetween. Thus, when the recirculation tube 58 is properly inserted into the square bore 80, the recirculation orifice 85 will be aligned with the radial bore 88 to establish a communication path between the axial bore 76 and the recirculation tube 58.

The recirculation tube 58 is also used to carry a beater 92 and a zig-zag shaped braking rod 94. The braking rod 94 assists in mixing the ice cream. The braking rod 94 also prevents coring of the ice cream. The beater 92 serves to cause the ice cream to flow as discussed below. More specifically, one end of the beater 92 is formed with an extending sleeve portion 96 having an inner diameter slightly larger than the outer diameter of the recirculation tube 58. This allows the beater 92 to rotate freely with respect to the recirculation tube 58. The other end of the beater 92 is provided with a square aperture 97 which receives the square portion 40 of the shaft 30, coupled to the drive motor. Thus, rotation of the drive motor causes the beater 92 to rotate relative to the recirculation tube 58. The beater 92 includes beater bars 98 and 99 skewed and sloped as shown in FIG. 4 for causing the soft serve ice cream to flow toward the closure plate 44 when the beater 92 is rotated in a counterclockwise direction when viewed from the front of the machine.

The recirculation tube 58 is also provided with a plurality of axial grooves 100 which form keyways. These keyways 100 are adapted to receive keys or pins 102 formed on a collar portion 104 formed at one end of the braking rod 94. This arrangement prevents rotation of the braking rod 94 when the beater 92 is rotating. Another collar 106, formed on the other end of the braking rod 94, is received on an inwardly extending cylindrical portion 108 on the end of the drive shaft 30. A cotter pin 110 is received in a radial bore 112 in the cylindrical portion 108 to secure the braking rod 94 thereto.

A wiper blade 114 is coupled to the beater 92 to wipe the ice cream from the interior wall of the tank 22. The wiper blade 114 is formed with oppositely disposed flanges 115 and 116. An outwardly extending pin 118 is provided on the flange 115, received in a slot 120 formed in a shoulder portion 122 of the beater 92. The other flange 116 is similarly provided with an outwardly extending pin 124, received in a slot 126 formed in an oppositely disposed shoulder portion 128 of the beater 92.

In operation, soft serve ice cream from a reservoir 136 is provided from the top of the tank 22. As the beater 92 rotates, the ice cream is forced toward the closure plate 44. If the dispensing valve 64 is in an open position, the ice cream will flow through the bore 76 into the dispensing chamber 55 and out the exit orifice 63 where it can be served in suitable receptacles, such as a cone or a cup. During this condition, ice cream is also recirculated through the recirculation passageway 56 and exits the recirculation tube 58 into the tank 22. Since the bore 56 has a relatively smaller diameter than the diameter of bore provided for the dispensing chamber 55 and the exit orifice 63, the soft serve ice cream will flow out of the dispensing chamber 55 at a relatively faster rate than into the recirculation passageway 56.

Another important aspect of the present invention is the facility in which the machine can be cleaned. More specifically, the recirculation tube 58 is formed from a hollow tube which about one third the distance of the tank. Once the braking rod 94 and the beater 92 are removed, the recirculation tube 58 can be easily removed from the closure plate 44 for cleaning. The closure plate 44, preferably formed as a one piece member 44, may also be cleaned relatively easily once the dispensing valve 64 is removed Obviously, many modifications and variations of the present invention are possible in light of the above teachings. Thus, it is understood that within the scope of the appended claims, the invention may be practiced otherwise than as specifically designated above.

What is claimed and desired to be secured by a Letters Patent is:

1. A soft serve ice cream machine comprising:
   a tank open at one end;
   means for refrigerating said tank;
   a closure plate for closing said one end of said tank, said closure plate including a dispensing chamber having an exit orifice and a recirculation passageway;
   means for recirculating ice cream in a recirculation loop from said tank through said recirculation passageway and back to said tank;
   means for selectively dispensing the soft serve ice cream from said dispensing chamber;
   means for sealing off said recirculation passageway from said dispensing chamber when soft serve ice cream is not being dispensed; and
   means for removing said ice cream from said dispensing chamber when said recirculation passageway has been sealed off from said dispensing chamber.

2. A soft serve ice cream machine as recited in claim 1, wherein said recirculating means includes means for forcing the ice cream toward said recirculation chamber.

3. A soft serve ice cream machine as recited in claim 1, wherein said recirculation loop is internal to said tank.

4. A soft serve ice cream machine as recited in claim 1, wherein said dispensing means includes means for opening and closing said exit orifice.

5. A soft serve ice cream machine as recited in claim 1, wherein said dispensing means includes a plunger type valve.

6. A soft serve ice cream machine as recited in claim 1, wherein said recirculation passageway includes means for communicating with an interior portion of said tank.

7. A soft serve ice cream machine as recited in claim 7 further including a braking rod.

8. A soft serve ice cream machine as recited in claim 7, wherein said braking rod is formed with a zig-zag shape.

9. A soft serve ice cream machine as recited in claim 1, wherein said removing means includes a closure plate having a longitudinal bore therethrough to form said dispensing chamber and to receive said dispensing valve therein, said dispensing valve extending the length of said bore such that said ice cream is removed from said dispensing chamber when said recirculating passageway has been sealed off from said dispensing chamber.

10. A soft serve ice cream machine as recited in claim 9, wherein said longitudinal bore has a cross-sectional configuration and dimensions slightly greater than the cross-sectional configuration and dimensions of said dispensing valve to allow said dispensing valve to slide within said longitudinal bore.

11. A soft serve ice cream machine as recited in claim 9, wherein said dispensing valve includes a plurality of annular grooves to receive O-rings therein to prevent ice cream from flowing adjacent to said dispensing valve within said longitudinal bore.

12. A soft serve ice cream machine comprising:
   a tank open at one end;
   means for refrigerating said tank;
   a closure plate for closing said one end of said tank, said closure plate including a dispensing chamber having an exit orifice and a recirculation passageway;
   means for recirculating ice cream in a recirculation loop from said tank through said recirculation passageway and back to said tank, said recirculating means includes a hollow tube having a recirculation orifice adapted to communicate with said recirculation passageway carried by said closure plate;

means for selectively dispensing the soft serve ice cream from said dispensing chamber; and means for sealing off said recirculation passageway from said dispensing chamber when soft serve ice cream is not being dispensed.

13. A soft serve ice cream machine as recited in claim 12, wherein said recirculation orifice is in a plane generally parallel to the axis of said hollow tube.

14. A soft serve ice cream machine as recited in claim 12 wherein said hollow tube is formed with a length less than the length of said tank.

15. A soft serve ice cream machine as recited in claim 14, wherein the length of said hollow tube is about one-third the length of said tank.

16. A soft serve ice cream machine comprising:
a tank open at one end;
means for refrigerating said tank;
a closure plate for closing said one end of said tank, said closure plate including a dispensing chamber having an exit orifice and a recirculation passageway, said recirculation passageway includes an axial bore formed in said closure plate;
means for recirculating ice cream in a recirculation loop from said tank through said recirculation passageway and back to said tank;
means for selectively dispensing the soft serve ice cream from said dispensing chamber; and
means for sealing off said recirculation passageway from said dispensing chamber when soft serve ice cream is not being dispensed.

17. A soft serve ice cream machine as recited in claim 11, wherein said recirculation NAB passageway further includes a radial bore formed in said closure plate in communication with said axial bore.

18. A soft serve ice cream machine as recited in claim 17, further including means for facilitating the flow of ice cream into said axial bore.

19. A soft serve ice cream machine as recited in claim 18, wherein said facilitating means includes a notch formed in said closure plate in communication with said axial bore.

20. A soft serve ice cream machine as recited in claim 19, wherein said notch is also formed to be in communication with said radial bore.

21. A soft serve ice cream machine as recited in claim 18, wherein said notch is formed with an inwardly sloping surface.

22. A soft serve ice cream machine comprising:
means for containing soft serve ice cream;
means for dispensing said ice cream including a dispensing chamber and a dispensing valve having a dispensing position and a recirculation position;
means for recirculating said ice cream including a recirculation passageway wherein said recirculation passageway is sealed off from said dispensing chamber when said dispensing valve is in a recirculation position; and
means for moving said ice cream from said dispensing chamber when said recirculation passageway has been sealed off from said dispensing chamber.

23. A soft serve ice cream machine as recited in claim 22, wherein said recirculating means includes a recirculation tube.

24. A soft serve ice cream machine as recited in claim 23, further including means for preventing rotation of said recirculation tube.

25. A soft serve ice cream machine comprising:
a tank open at one end;
means for refrigerating said tank;
a closure plate for closing said one end of said tank, said closure plate including a dispensing chamber having an exit orifice and a recirculation passageway;
means for recirculating ice cream in a recirculation loop from said tank through said recirculation passageway and back to said tank, said recirculating means including a recirculation tube;
means for selectively dispensing the soft serve ice cream from said dispensing chamber;
means for sealing off said recirculation passageway from said dispensing chamber when soft serve ice cream is not being dispensed; and
means for preventing rotation of said recirculation tube, said rotation preventing means including a non-circular bore in said closure plate and having one end of said recirculation tube with a complementary shape for being received in said non-circular bore.

* * * * *